(12) United States Patent
Orito et al.

(10) Patent No.: US 6,355,205 B1
(45) Date of Patent: Mar. 12, 2002

(54) MULTI-FUNCTION LANCE FOR A VACUUM DEGASSING CHAMBER AND A METHOD OF USING THE SAME

(75) Inventors: Kenichi Orito; Kousei Kuriwaki; Masaaki Takada, all of Tokyo (JP)

(73) Assignee: Kawasaki Steel Corporation, Hyogo (JP)

( * ) Notice: Subject to any disclaimer, the term of this patent is extended or adjusted under 35 U.S.C. 154(b) by 0 days.

(21) Appl. No.: 09/571,657

(22) Filed: May 15, 2000

(30) Foreign Application Priority Data

May 21, 1999 (JP) .......................................... 11-141812

(51) Int. Cl.⁷ .............................. C21B 7/24; C21C 5/32
(52) U.S. Cl. ......................................... 266/99; 266/225
(58) Field of Search ........................... 75/414; 266/225, 266/44, 99, 100

(56) References Cited

U.S. PATENT DOCUMENTS

| | | |
|---|---|---|
| 4,971,550 A | 11/1990 | Schingnitz et al. |
| 5,931,985 A * | 8/1999 | Schoeler et al. ............... 75/414 |

FOREIGN PATENT DOCUMENTS

| | | |
|---|---|---|
| DE | 43 06 980 | 9/1994 |
| EP | 0 584 814 | 3/1994 |
| GB | 2 150 269 | 6/1985 |
| JP | 06-074425 | 3/1994 |
| JP | 7-41827 | 2/1995 |
| JP | 7-145423 | 6/1995 |
| WO | WO-96/16190 A1 * | 5/1996 |

* cited by examiner

Primary Examiner—Scott Kastler
(74) Attorney, Agent, or Firm—Young & Thompson

(57) ABSTRACT

A multi-function lance for insertion into a vacuum degassing chamber, includes a top-blown oxygen lance provided as a path for gaseous oxygen. A nozzle is provided at a downstream end of the oxygen path used for blowing oxygen onto a molten metal. A water-cooled jacket surrounds the outer periphery of the top-blown oxygen lance. At least a set of paths for a fluid fuel and a gas for burning the fuel is positioned in a multi-function lance, namely in the water-cooled jacket, and a combustion burner is provided at a downstream end of the path. By using the multi-function lance according to the present invention, not only a safer and shorter preheating operation is enabled, but also oxygen lancing, temperature elevation of molten steel, and heating of the vacuum degassing apparatus itself are smoothly realized.

13 Claims, 7 Drawing Sheets

CROSS SECTION TAKEN
ALONG LINE A – A

MULTI-FUNCTION LANCE FOR A VACUUM DEGASSING CHAMBER AND A METHOD OF USING THE SAME

BACKGROUND OF THE INVENTION

1. Field of the Invention

The present invention relates to a multi-function lance for use in a vacuum degassing chamber. The invention also relates to a technique for continuously performing, by using such a lance either intermittently or continuously, the multiple operations of preheating a vacuum degassing apparatus (generally comprising a vacuum degassing chamber, an evacuation means, a ladle, etc.) for vacuum refining, composition control and the like, of a molten steel; elevating the temperature of molten steel maintained inside the apparatus; blowing gaseous oxygen for decarburization and refining the molten steel, and blowing a powdered desulfurizing agent or the like for composition control of the molten steel.

2. Description of The Related Art

Recently, the molten steel output from a conversion furnace or an electric furnace is often subjected to further refining (denoted as secondary refining) in order to produce a high quality steel. For such secondary refining, a prevailing method comprises blowing oxygen onto the molten steel maintained inside the vacuum degassing apparatus (which is often referred to hereinafter as "a degassing chamber") to perform decarburization. However, in such decarburization refining, the temperature of the molten steel can be lowered too greatly when the chamber is insufficiently preheated, or smooth operation can be disrupted due to the adhesion of a large quantity of raw metal to the inner wall of the degassing chamber.

Consequently, various countermeasures have been studied and implemented, such as preheating the degassing chamber itself, elevating the temperature of the molten steel, etc. Recently, in JP-A-Hei6-73431 (the term "JP-A" as used herein signifies "an unexamined published Japanese patent application") there was proposed a vacuum degassing apparatus known as a so-called "complex lance 1" as shown in present FIG. 4, comprising an oxygen blowing portion having a throat portion 15 provided in its axial core, a downwardly extending portion 16 connected to the lower side thereof, and a gaseous fuel supply hole 17 opening into the downwardly extending portion 16. This vacuum degassing apparatus is intended to achieve greatly favorable effects of blowing oxygen to the molten steel, heating the molten steel by burning gaseous fuel with oxygen, and preventing raw metal from adhering to the degassing chamber, etc., by using only one complex lance 1.

However, according to the structure of the complex lance disclosed in JP-A-Hei6-73431, a gaseous fuel is simply blown out from the nozzle portion and mixed with oxygen. Consequently, the calorific value provided thereby was found insufficient as a practical matter to preheat the inside of the degassing chamber. Furthermore, because the structure is extremely simple, the following problems were expected to occur in practice:

(1) The structure is effective only when spontaneous ignition occurs upon mixing the oxygen and gaseous fuel, and the temperature therefore cannot be raised once the temperature inside the degassing chamber has been lowered. Moreover, the reliability is very poor.

(2) Even in case spontaneous ignition occurs, if for any reason the burning gas becomes extinguished during the operation, there remains a danger of causing an explosion due to the fuel gas filling inside the chamber.

(3) Thus, from the viewpoint of safety, the necessary preheating operation of the degassing chamber takes such a long time that productivity is decreased.

SUMMARY OF THE INVENTION

The present invention seeks to overcome the above-described problems by providing a multi-function lance for a vacuum degassing apparatus, that is capable of not only performing a preheating operation in a safer manner and in a shorter amount of time, but also blowing oxygen, elevating the temperature of molten steel, heating the vacuum degassing apparatus itself, and refining and controlling the composition of the molten steel by feeding powdered desulfurizing agents and the like, all using the same lance.

In order to achieve this object, the present inventors conducted extensive studies, and as a result developed a multi-function lance for use in a vacuum degassing chamber comprising a water-cooled cylindrical top-blown oxygen lance being equipped with a path for gaseous oxygen, and a nozzle provided at the downstream end of the oxygen path and used for blowing oxygen onto a molten metal; a water-cooled jacket surrounding the outer periphery of the top-blown oxygen lance; one or a plurality of a set of paths for a fluid fuel and a gas for burning the fuel, being positioned in the multi-function lance; and a combustion burners provided at the downstream end of said paths.

In accordance with another aspect of the present invention, there is provided a multi-function lance for vacuum degassing chamber as above, wherein at least one of said burners is equipped with an internally provided ignition plug.

According to still another aspect of the present invention, there is provided a multi-function lance for a vacuum degassing chamber as above, wherein an aperture having a transparent plate is provided axially centrally of the top-blown oxygen lance, and a sensor is provided that detects the flame via the aperture.

Figure 5A:
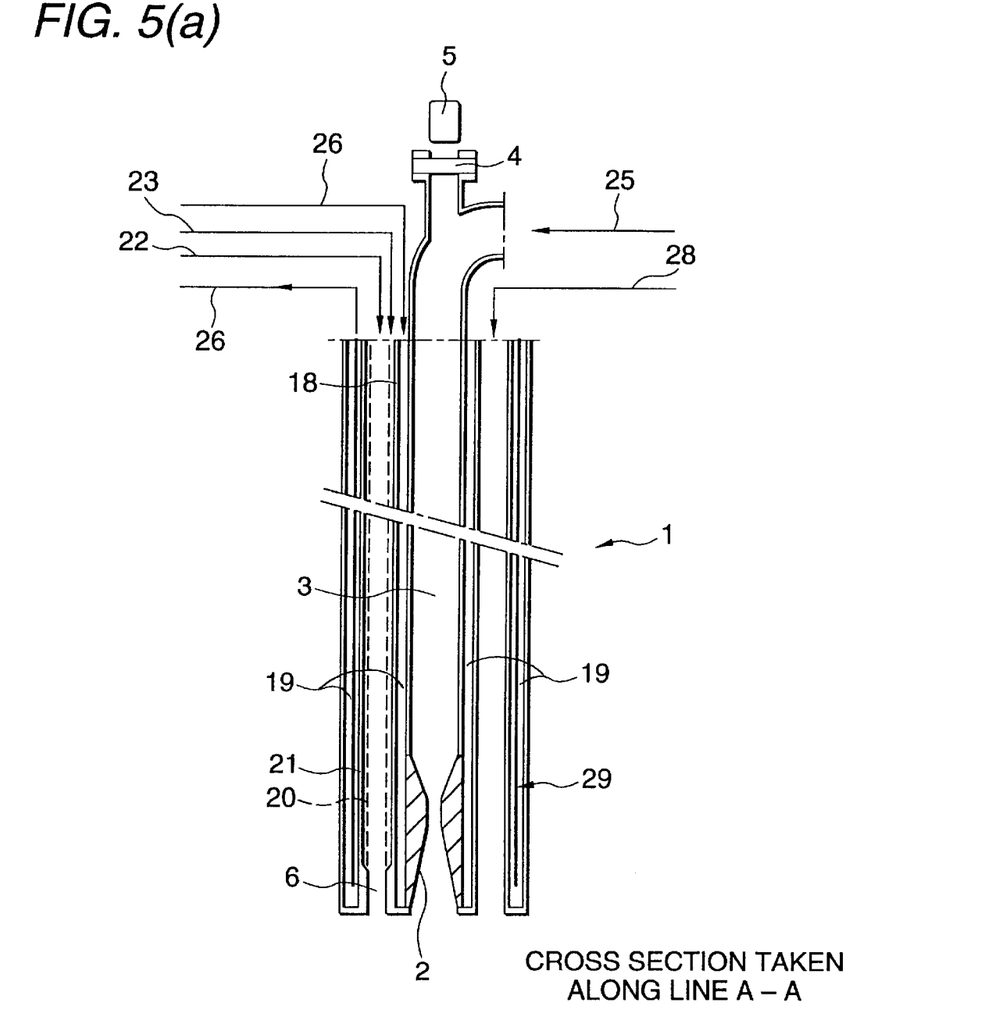
Figure 5B:
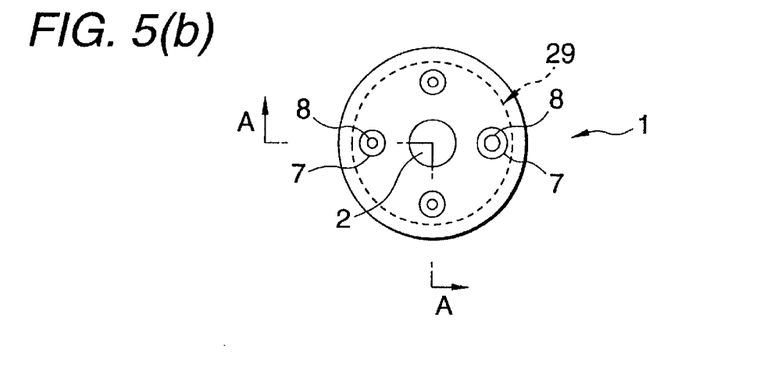
Figure 6A:
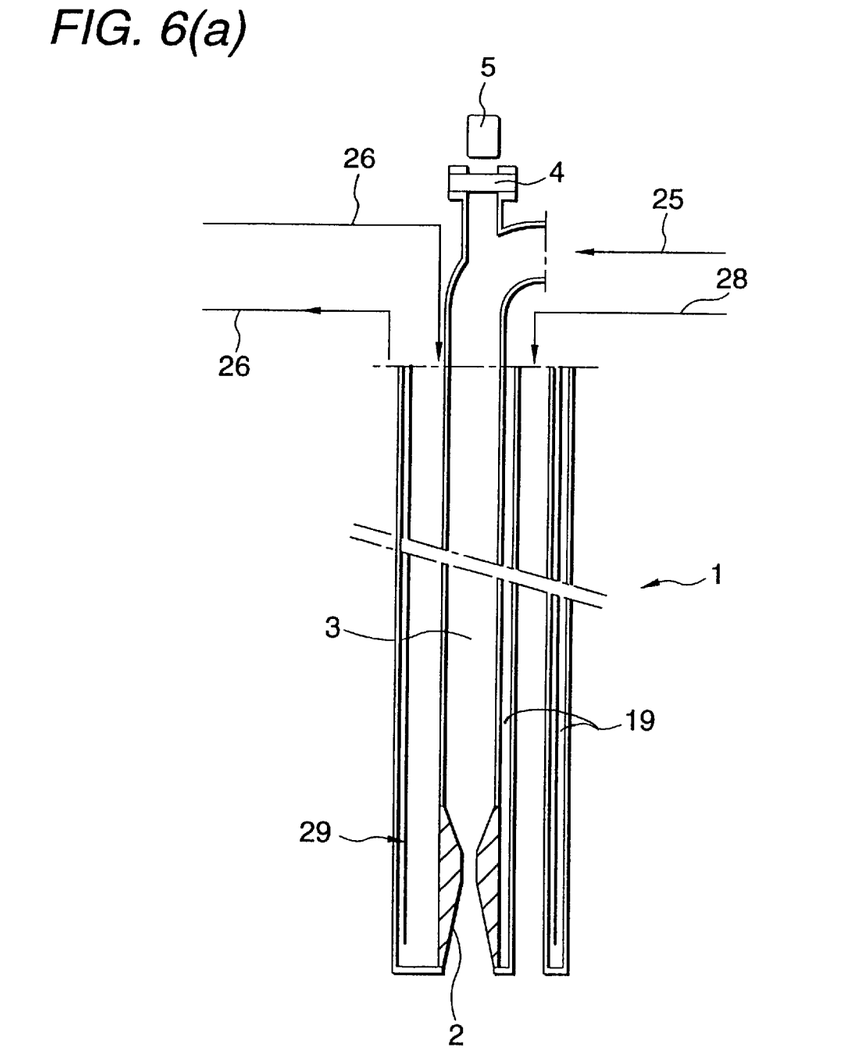
Figure 6B:
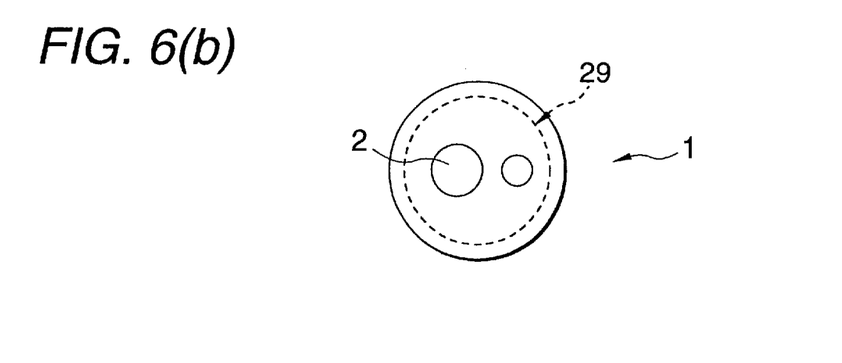

According to a further aspect of the present invention, here is provided a multi-function lance for a vacuum egassing chamber wherein a lance for blowing a powder is provided in parallel with the burner as shown in FIG. 5, or, instead of the burners, one or a plurality of lances for blowing a powder, are provided between said top-blown oxygen lance and the water-cooling jacket as shown in FIG. 6.

The present invention also provides a method for using a multi-function lance in a vacuum degassing chamber, comprising actuating a combustion burner disposed in a vacuum degassing chamber comprising a top-blown oxygen lance equipped with a gaseous oxygen path formed with a nozzle provided at the downstream end of said oxygen path used for blowing oxygen onto a molten metal; a water-cooled jacket surrounding the outer periphery of the top-blown oxygen lance; one or a plurality of a set of paths for a fluid fuel and a gas for burning the fuel, being defined between the top-blown oxygen lance and the water-cooled outer jacket; a combustion burners provided at the downstream end of said paths; and a sensor provided as such that it detects the flame via an aperture provided in a transparent plate at the axial center of the top-blown oxygen lance; and supplying a small amount of oxygen to the inside of a top-blown oxygen lance connected to said aperture so as to elevate the temperature of the portion of the flame which is being detected by said sensor.

The invention also includes a method for using a multi-function lance in a vacuum degassing chamber, comprising operating a combustion burner associated with a vacuum degassing chamber that comprises a water-cooled cylindrical top-blown oxygen lance equipped with a gaseous oxygen path formed with a nozzle provided at the downstream end of said oxygen path used for blowing oxygen onto a molten metal; a water-cooled jacket surrounding the outer periphery of said top-blown oxygen lance; one or a plurality of a set of paths for a fluid fuel and a gas for burning the fuel, being positioned in the multi-function lance; and a combustion burners provided at the downstream end of said paths; wherein a powder is supplied to the inside of the top-blown oxygen lance to blow the powder onto the molten metal in the vacuum degassing chamber from the lance.

Thus, the multi-function lance of the present invention prevents the fluid fuel from being extinguished during operation, and enables heating a degassing chamber and blowing of oxygen in a safer and far more stable manner.

BRIEF DESCRIPTION OF THE DRAWINGS

FIG. 1(*a*) is an axial sectional view of an embodiment of the multi-function lance according to the present invention;

FIG. 1(*b*) is a plan view of the FIG. 1(*a*) embodiment;

FIG. 5(*a*) is an axial sectional view, along line A—A of FIG. 5(*b*), of a multi-function lance according to another embodiment of the present invention, provided with a lance specifically used for blowing a powder in parallel with the burner, and a section plate 29 for establishing a defined path for circulation of cooling water;

FIG. 5(*b*) is a plan view of the FIG. 5(*a*) embodiment;

FIG. 6(*a*) is an axial sectional view of a multi-function lance according to yet another embodiment of the present invention, provided with a lance specifically used for blowing a powder in the place of the burner;

FIG. 6(*b*) is a plan view of the FIG. 6(*a*) embodiment; and

DETAILED DESCRIPTION OF PREFERRED EMBODIMENTS

A fuller explanation of the present invention will now be given with reference to the accompanying drawings, which illustrate preferred but non-limiting examples of the present device and method. In the drawings, the following list associates the depicted reference numerals with the associated component:

1 Multi-function lance
2 Nozzle
3 Path for gaseous oxygen
4 Inflammable transparent plate
4' Aperture
5 Sensor
6 Combustion burner
7 Path for fluid fuel
8 Path for a combustion gas (e.g., air)
9 Ignition plug
10 Vacuum degassing chamber (degassing chamber)
11 Slag pot
12 Ladle
13 Molten steel
14 Alloy hopper
15 Throat portion
16 Downwardly extending portion
17 Fuel gas supplying portion
18 Water-cooled cylindrical top-blown oxygen lance
19 Water-cooling jacket
20 Inner tube
21 Outer tube
22 Fluid fuel
23 Combustion gas (e.g., oxygen)
25 Gaseous oxygen
26 Cooling water
27 Melt
28 Powder
29 Section plate for cooling water
30 Powder compression feeding tank
31 Gaseous nitrogen
32 Compression-feeding powder An embodiment according to the present invention is described below with reference to drawings for a case comprising four burners.

Figure 1A:
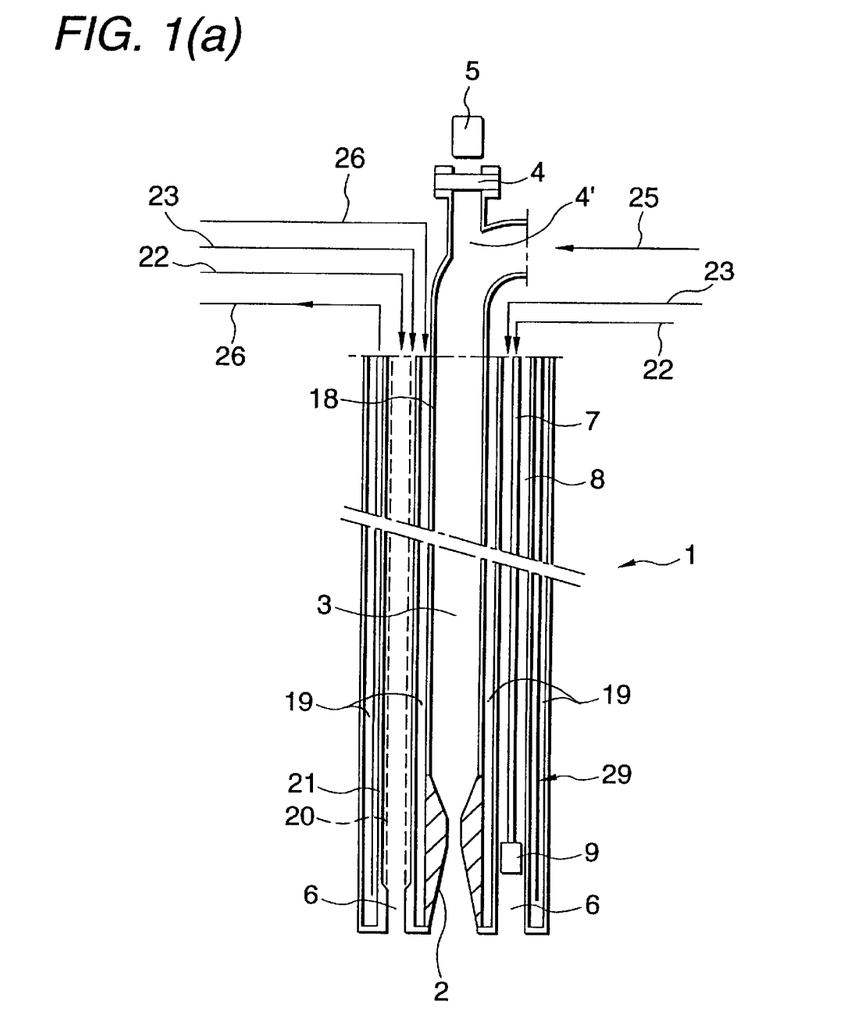
Figure 1B:
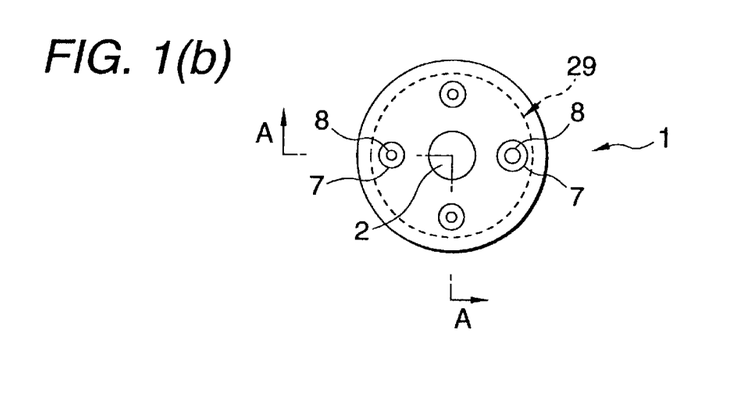

Referring to FIG. 1(*a*) and FIG. 1(*b*), a multi-function lance 1 for a vacuum degassing apparatus according to the present invention is based on water-cooled cylindrical top-blown oxygen lance 18 having a path for gaseous oxygen 3 and a nozzle 2, which supply oxygen to be blown against the molten steel. The top-blown oxygen lance 18 is further surrounded by a water-cooling jacket 19 and a section plate for cooling water 29 is positioned in the multi-function lance, namely in water-cooling jacket 19. A plurality of pipes are provided between the water-cooling outer jacket 19 and the top-blown oxygen lance 18 to provide paths 7 for a fluid fuel 22 and paths 8 for a combustion gas (e.g., oxygen) 23. The downstream end of the pipes include built-in combustion burners 6 (referred simply hereinafter as "burners 6"). The burners 6 are generally provided in a double-tube structure, such that a fluid fuel (e.g., LPG) 22 flows through the inner tube 20 and a combustion gas 23 for the fuel flows through the outer tube 21. An important aspect of the present invention is that an ignition plug 9 (at the downstream end of the inner tube 20) is attached to at least one of the plurality of burners 6, so that a spark is generated to ignite the gas mixture comprising the fluid fuel 22 and the combustion gas 23. In this manner, extinguishing during the operation of the burner 6 can be prevented from occurring.

In the present invention, to further increase the function of preventing extinguishing, a non-flammable transparent plate 4 made of quartz glass or the like is attached to the upstream end (i.e., the side opposite to the nozzle on the concentric axis) of the cylinder used as the path for gaseous oxygen 3, so that the interior may be observed therethrough, and a sensor 5 (e.g., an ultraviolet detector) is provided for detecting the flame. If no flame is detected by the sensor 5, the supply of the fluid fuel 22 and the combustion gas 23 to the burner 6 is halted, and a signal is sent to purge with an inert gas such as $N_2$. Furthermore, a small amount of auxiliary oxygen for aiding combustion is simultaneously supplied to nozzle 2 together with the supply of the fluid fuel 22 so as to maintain the high temperature by stabilizing the flame in the vicinity of the nozzle 2 at a predetermined temperature. In this manner, false alarms from the sensor 5 are prevented.

The method for using the multi-function lance 1 according to the present invention in a vacuum degassing chamber 10 is described below. The inner and outer pipes (i.e., the paths 7 and 8 for the fluid fuel and the combustion gas, respectively) of the burner 6 are first purged with an inert gas such as gaseous $N_2$ for a predetermined duration of time, and, after supplying a fluid fuel 22 and a combustion gas 23 to the burner equipped with an ignition plug, the fuel is ignited by generating a spark. After confirming the ignition of the fuel by using the detection sensor 5 for the flame, or after the passage of a predetermined duration of time, the fluid fuel 22 and the combustion gas 23 are supplied to the other burner 6 to start combustion. After a passage of a predetermined duration of time, the combustion flame is monitored with the sensor 5. If the flame is detected, the supply of the fluid fuel and the like is continued, but if the flame is not detected, the flame is extinguished and the inside of the burner 6 is purged with an inert gas such as gaseous $N_2$. Simultaneously with the supply of the fluid fuel 22 to the burner 6, a small amount of oxygen is supplied to the nozzle 2 to maintain the monitored flame at a high temperature, thereby preventing the malfunction of the sensor 5 from occurring. As a matter of course, if combustion failure occurs, the auxiliary oxygen gas for aiding combustion is stopped at the time the extinction is detected, and gaseous $N_2$ is supplied instead.

On the other hand, when aluminum is added to the molten steel 13 inside the vacuum degassing chamber 10 to elevate the temperature, or in case refining such as decarburization and the like is conducted, gaseous oxygen is blown from the nozzle 2 to accelerate the oxidation reaction. In such a case, no heating by the burner 6 of the (vacuum) degassing chamber 10 or the molten steel 13 is performed. Instead, a predetermined amount of inert gas such as gaseous $N_2$ is supplied to the burner to avoid clogging of the front end of the burner due to splashes and the like.

In case of performing composition control such as desulfurization by adding a powdered desulfurizing agent, etc., to the molten steel 13 inside the vacuum degassing chamber 10, the powder is blown from an oxygen lance or a specifically provided lance. If a specific lance is used, the heating of the degassing chamber 10 using the burner 6 and the blowing of oxygen from the nozzle 2 is halted, and, instead, an inert gas such as gaseous $N_2$ (nitrogen) is supplied to the nozzle 2 and burner 6 in a predetermined quantity to avoid clogging of the front end of each lance due to splashes and the like.

EXAMPLE 1

Figure 2:
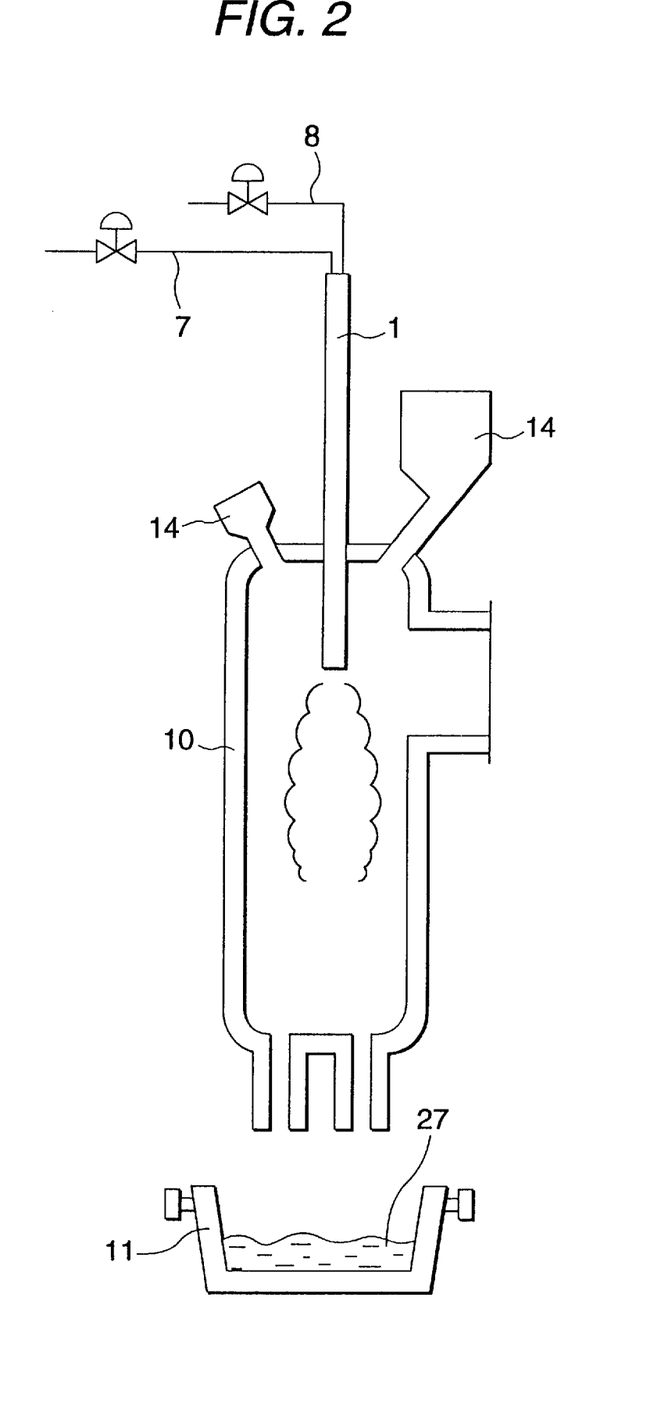
FIG. 2 shows a preheating stage of a degassing tank using the multi-function lance according to the present invention.
Figure 4:
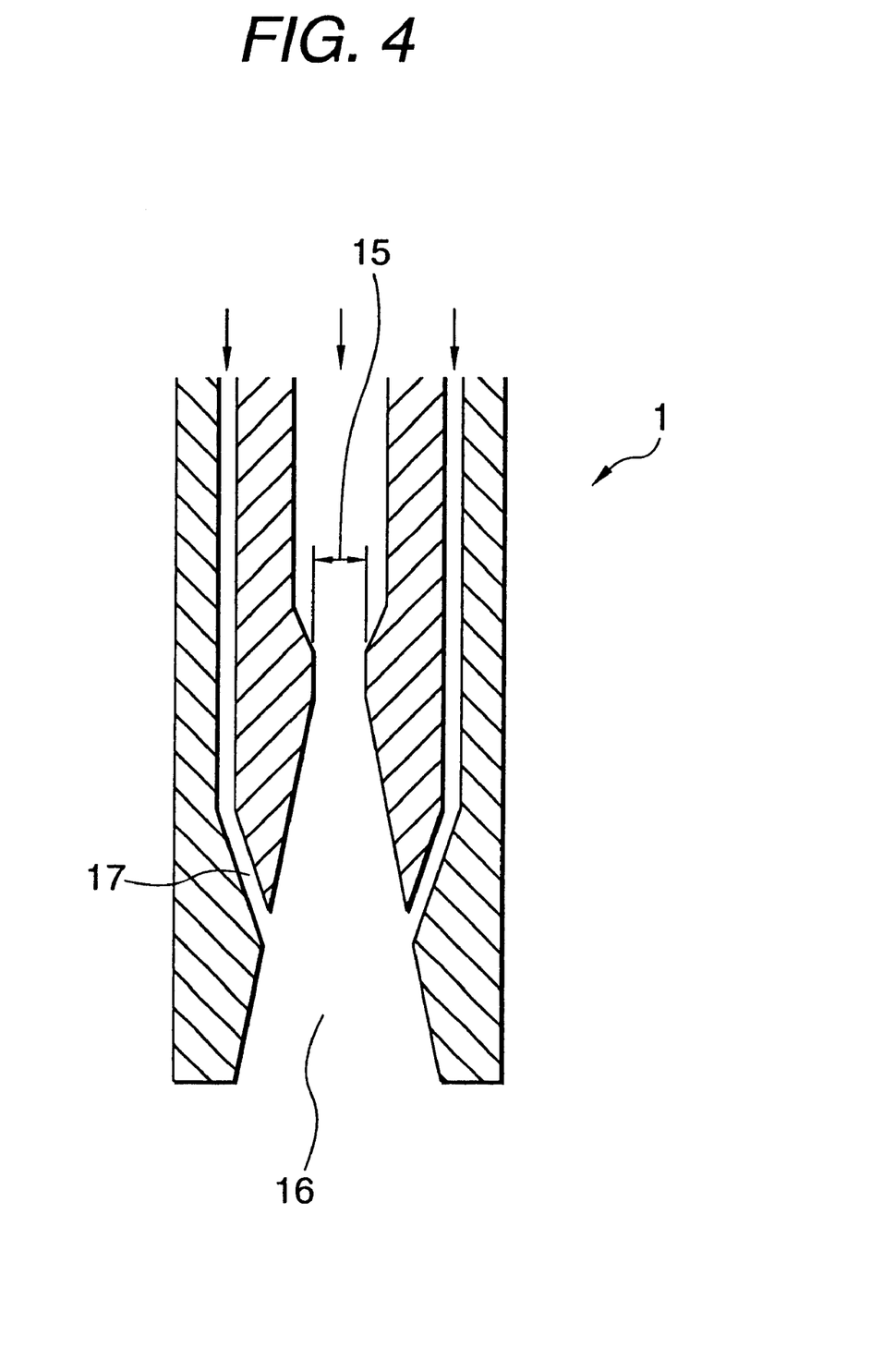
FIG. 4 shows a vertical cross section view of a prior art complex lance.

A multi-function lance 1 according to the present invention was applied to a vacuum degassing apparatus 10 of a RH type. Since a large quantity of raw metal was first found to be adhered to the inner wall surfaces of the degassing chamber 10 used in vacuum refining, the raw metal was removed while operation was suspended, and, at the same time, the degassing chamber 10 was preheated for the next operation. After placing a vessel 11 (denoted as "a slag pot") for receiving the melt 27 (e.g., raw metal, slag, etc.) at the lower side of the degassing chamber 10 as shown in FIG. 2, a multi-function lance 1 according to the present invention was inserted from the upper side of the degassing chamber 10 and positioned. Then, in accordance with the heating method of the degassing chamber 10 as described above, the burner 6 of the multi-function lance 1 was used to preheat the degassing chamber 10. The vacuum degassing tank 10 is a RH type vacuum degassing tank capable of processing 180 tons of molten steel, and the preheating of the chamber was conducted for 5 hours in total by using gaseous propane as the fluid fuel, which was supplied at a flow rate of 60 Nm3/hr for 4 hours and at 134 Nm3/hr for one hour. During this process the temperature of the inner wall of the chamber was raised from 1045° C. to 1400° C. As a result, the removal of the raw metal and the preheating were smoothly achieved without suffering any extinction. The time necessary for the preheating was only about 70% of the time necessary in case of using a conventional lance 1 as shown in FIG. 4.

Figure 3:
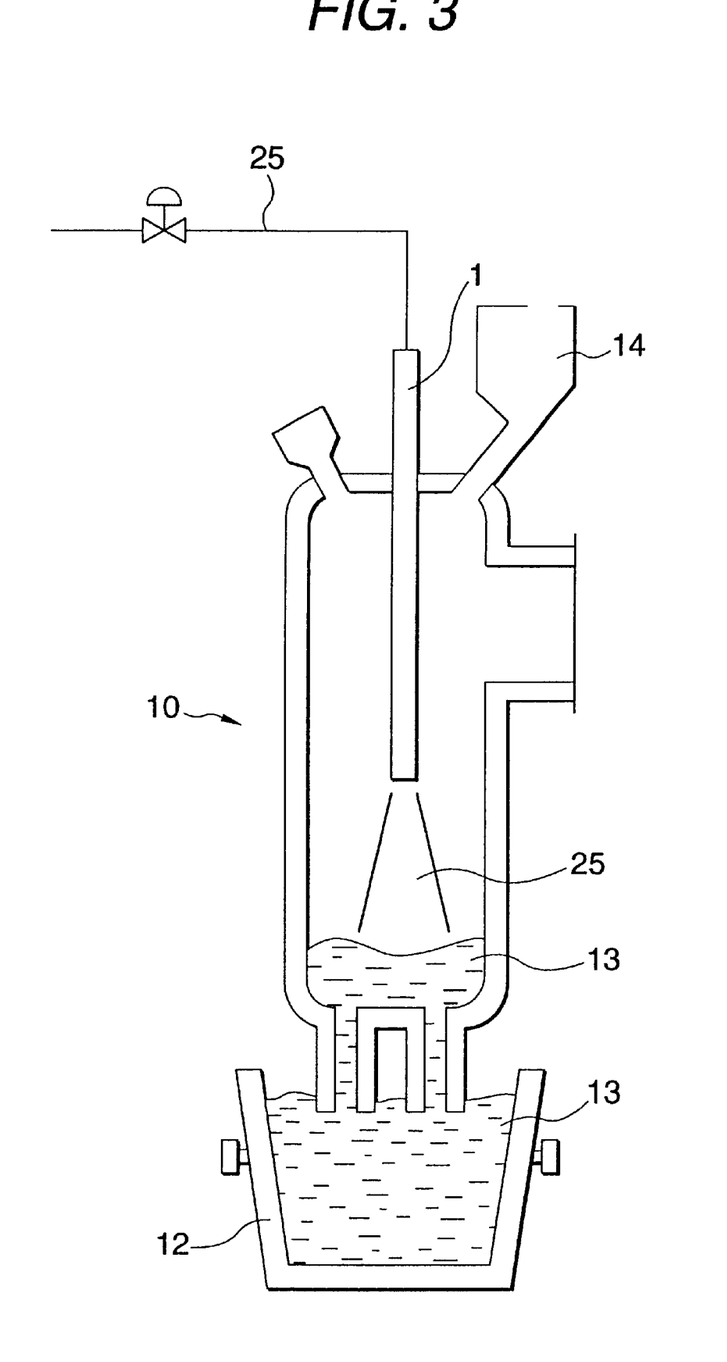
FIG. 3 shows a decarburizing refining stage of a molten steel using the multi-function lance according to the present invention.

Then, by using the preheated vacuum degassing chamber 10, the decarburization smelting of a molten steel 13 was carried out. The molten steel 13 was fed into the ladle 12, and the lower portion of the degassing chamber 10 was immersed therein. Thus, smelting was conducted by circulating the molten steel 13 under vacuum between the ladle 12 and the degassing chamber 10. In this case, as shown in FIG. 3, the multi-function lance 1 according to the present invention was inserted from the upper side of the degassing chamber 10 and positioned, such that gaseous oxygen 25 was blown under predetermined conditions to the molten steel 13 via the nozzle 2. The concentration of carbon (C) incorporated in the molten steel in the ladle (12) immediately after output from the conversion furnace was 496 ppm. Thus, by using the lance according to the present invention in an RH type vacuum degassing chamber (10), the molten steel was subjected to oxygen lancing refining under vacuum at an oxygen flow rate of 20 Nm3/min for a predetermined duration of time. After 23 minutes, the carbon concentration of the molten steel was found to be decreased to the region of super-low carbon content of 20 ppm. As a result, it was found that the decarburization of the molten steel 13 was conducted smoothly in a manner comparable to a case using a conventional lance 1 of FIG. 4.

EXAMPLE 2

Figure 7:
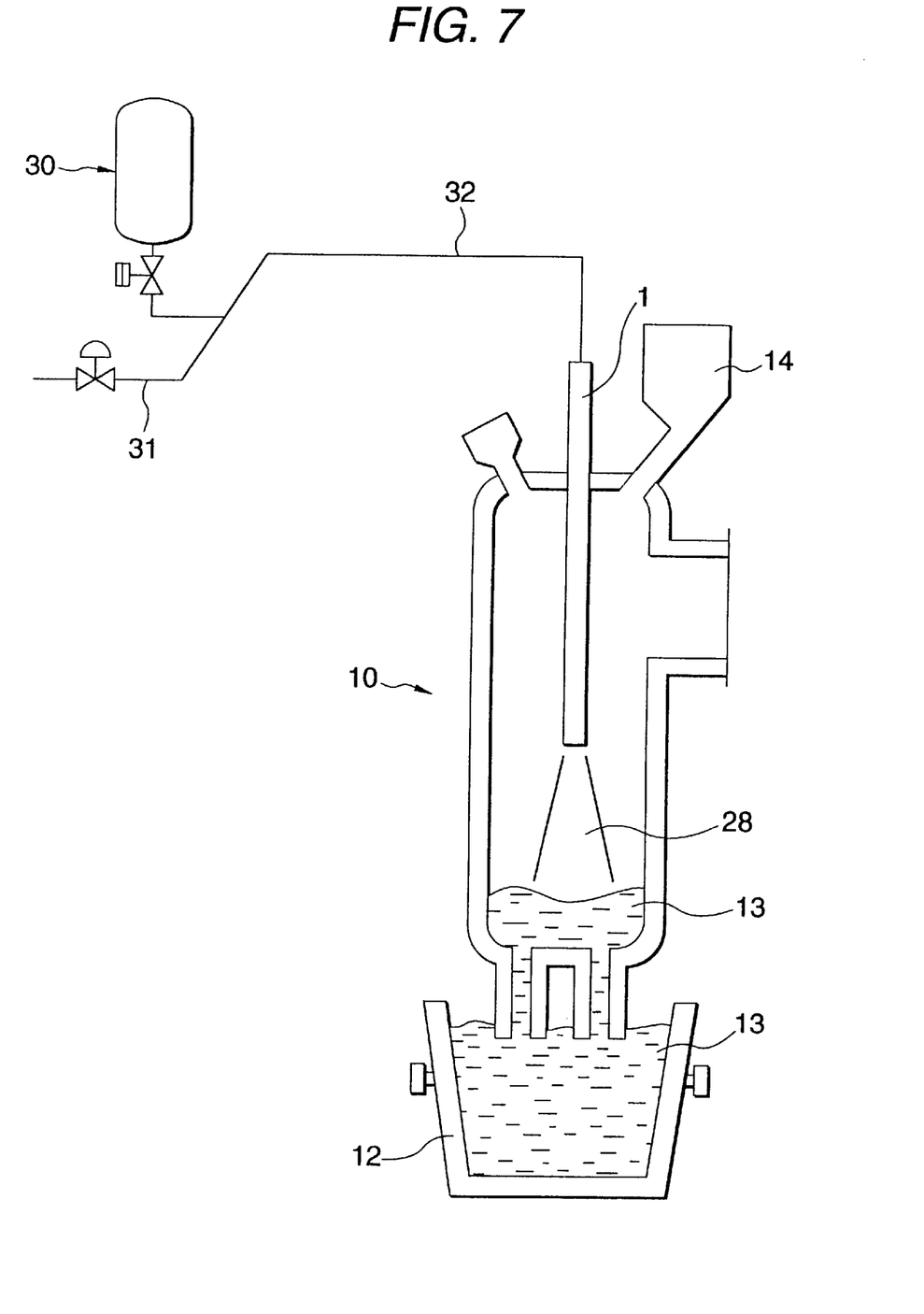
FIG. 7 shows a stage of blowing powder onto molten steel in case powder is supplied to an upward oxygen blowing lance.

Referring to FIG. 7, an example of blowing a desulfurizing agent based on CaO using a multi-function lance according to the present invention is described below.

The powder was lanced under conditions as follows:

Amount of desulfurizing agent blown—6.7 kg/ton of molten steel blowing rate—100 to 126 kg/min blowing duration—15 to 18 minutes Flow rate of carrier gas—3.0 Nm3/min As a result, the content of sulfur was reduced to 15 ppm or less.

As described above, a safer preheating, decarburization refinig, or desulfurization operation, or any combination of these operations, can all be achieved using the same lance according to the invention, and in a shorter time.

While the invention has been described in detail by making reference to specific examples, it should be understood that various changes and modifications can be made without departing from the scope and the spirit of the present invention.

What is claimed is:

1. A method of using a multi-function lance in a vacuum degassing chamber, comprising a water-cooled cylindrical top-blown oxygen lance equipped with an gaseous oxygen path formed with a nozzle provided at a downstream end of said oxygen path used for blowing oxygen onto a molten metal; a water-cooled jacket surrounding the outer periphery of said top-blown oxygen lance; at least a set of paths for a fluid fuel and a gas for burning the fuel, being positioned in a multi-function lance; a combustion burner provided at a downstream end of said paths; and a sensor that detects a flame via an aperture provided in a transparent plate at the axial center of said top-blown oxygen lance; and supplying a small amount of oxygen to the inside of the top-blown oxygen lance in such a manner to elevate the temperature of the portion of the flame which is being detected by said sensor through said aperture.

2. A multi-function lance for use in a vacuum degassing chamber, comprising:

a water-cooled cylindrical top-blown oxygen lance having a gaseous oxygen path formed with a nozzle provided at a downstream end of said oxygen path and used for blowing oxygen onto a molten metal;

a water-cooled jacket surrounding the outer periphery of said top-blown oxygen lance;

at least a set of paths for a fluid fuel and a gas for burning the fuel being positioned in a multi-function lance;

a combustion burner provided at a downstream end of said paths;

an aperture having a transparent plate provided axially centrally of said top-blown oxygen lance; and a sensor provided to detect a flame via the aperture.

3. The multi-function lance as claimed in claim 2, further comprising a section plate for water cooling.

4. The multi-function lance as claimed in claim 2, further comprising a lance for blowing a powder provided in parallel with the burner in the multi-function lance.

5. The multi-function lance as claimed in claim 2, further comprising at least one lance for blowing a powder provided between said top-blown oxygen lance and the water-cooling jacket.

6. A multi-function lance for use in a vacuum degassing chamber, comprising:

a water-cooled cylindrical top-blown oxygen lance having a gaseous oxygen path formed with a nozzle provided at a downstream end of said oxygen path and used for blowing oxygen onto a molten metal;

a water-cooled jacket surrounding the outer periphery of said top-blown oxygen lance;

at least a set of paths for a fluid fuel and a gas for burning the fuel being positioned in a multi-function lance;

a combustion burner provided at a downstream end of said paths, wherein said at least one burner is equipped with an internally provided ignition plug;

an aperture having a transparent plate provided axially centrally of said top-blown oxygen lance; and a sensor provided to detect a flame via the aperture.

7. The multi-function lance as claimed in claim 6, further comprising a section plate for water cooling.

8. The multi-function lance as claimed in claim 6, further comprising a lance for blowing a powder provided in parallel with the burner in the multi-function lance.

9. The multi-function lance as claimed in claim 6, further comprising at least one lance for blowing a powder provided between said top-blown oxygen lance and the water-cooling jacket.

10. A multi-function lance for use in a vacuum degassing chamber, comprising:

a water-cooled cylindrical top-blown oxygen lance having a gaseous oxygen path formed with a nozzle provided at a downstream end of said oxygen path and used for blowing oxygen onto a molten metal;

a water-cooled jacket surrounding the outer periphery of said top-blown oxygen lance;

at least a set of paths for a fluid fuel and a gas for burning the fuel being positioned in a multi-function lance; and a combustion burner provided at a downstream end of said paths, wherein said at least one burner is equipped with an internally provided ignition plug.

11. The multi-function lance as claimed in claim 10, further comprising a section plate for water cooling.

12. The multi-function lance as claimed in claim 10, further comprising a lance for blowing a powder provided in parallel with the burner in the multi-function lance.

13. The multi-function lance as claimed in claim 10, further comprising at least one lance for blowing a powder provided between said top-blown oxygen lance and the water-cooling jacket.

* * * * *

UNITED STATES PATENT AND TRADEMARK OFFICE
CERTIFICATE OF CORRECTION

PATENT NO. : 6,355,205 B1  
DATED : March 12, 2002  
INVENTOR(S) : Kenichi Orito, Kousei Kuriwaki and Masaaki Takada It is certified that error appears in the above-identified patent and that said Letters Patent is hereby corrected as shown below:

Drawings,
Sheet 1, Fig. 1(b), reference numeral 7 (both occurrences) should be changed to 8 and reference numeral 8 (both occurrences) should be changed to 7 as follows:

Sheet 5, Fig. 5(b), reference numeral 7 (both occurrences) should be changed to 8 and reference numeral 8 (both occurrences) should be changed to 7 as follows:

Signed and Sealed this

First Day of April, 2003

JAMES E. ROGAN  
*Director of the United States Patent and Trademark Office*